United States Patent [19]
Madden, Jr.

[11] Patent Number: 5,811,719
[45] Date of Patent: *Sep. 22, 1998

[54] REMOVABLE BULLET RESISTANT APPARATUS FOR VEHICLES

[76] Inventor: James R. Madden, Jr., 2107 E. Chesapeake Rd., Gilbert, Ariz. 85234

[*] Notice: The term of this patent shall not extend beyond the expiration date of Pat. No. 5,271,311.

[21] Appl. No.: 690,579

[22] Filed: Jul. 31, 1996

Related U.S. Application Data

[60] Continuation of Ser. No. 392,056, Feb. 22, 1995, abandoned, which is a division of Ser. No. 316,253, Sep. 30, 1994, Pat. No. 5,413,026, which is a division of Ser. No. 139,313, Oct. 19, 1993, Pat. No. 5,370,035, which is a continuation-in-part of Ser. No. 792,645, Nov. 15, 1991, Pat. No. 5,271,311.

[51] Int. Cl.$^6$ ............................................... F41H 5/06
[52] U.S. Cl. ............................... 89/36.08; 89/36.02
[58] Field of Search .................. 89/36.01, 36.02, 89/36.09, 36.08, 36.07; 296/152, 154; 109/49.5

[56] References Cited

U.S. PATENT DOCUMENTS

| | | | |
|---|---|---|---|
| 726,988 | 5/1903 | von Reichenau | 89/36.08 |
| 2,261,301 | 11/1941 | Smith | 296/152 |
| 2,350,297 | 5/1944 | Vesta | 296/152 |
| 2,633,377 | 3/1953 | Schostal | 296/152 |
| 3,923,339 | 12/1975 | McDonald | 428/911 |
| 4,776,903 | 10/1988 | Nordskog | 156/64 |
| 4,813,334 | 3/1989 | Bloks et al. | 89/36.02 |
| 5,180,880 | 1/1993 | Zufle | 89/36.02 |
| 5,271,311 | 12/1993 | Madden, jr. | 89/36.08 |
| 5,370,035 | 12/1994 | Madden, Jr. | 89/36.08 |

FOREIGN PATENT DOCUMENTS

| | | | |
|---|---|---|---|
| 1150139 | 1/1958 | France | 89/36.08 |
| 1318145 | 5/1973 | United Kingdom | 89/36.08 |

OTHER PUBLICATIONS

Brady, Materials Handbook (Eigth Edition), 1956, pp. 8–10.
Hackh's Chemical Dictionary, Grant, 1969, p. 732.
The Condensed Chemical Dictionary, Hawley, 1971, pp. 701, 705.

*Primary Examiner*—Stephen M. Johnson
*Attorney, Agent, or Firm*—H. Gordon Shields

[57] ABSTRACT

Removable bulletproof apparatus for a vehicle includes a flexible curtain secured to a door of the vehicle. The flexible curtain is secured to a frame below a window in the door. The curtain is bullet resistant. The curtain may be easily installed and easily removed from the door. The curtain is made of layers of fibrous material, such as woven cloth, preferably of an aramid fiber, such as a "Kevlar" cloth, or "SPECTRA SHIELD" material. A bullet resistant flap of the same material as the curtain pivots on the curtain.

7 Claims, 5 Drawing Sheets

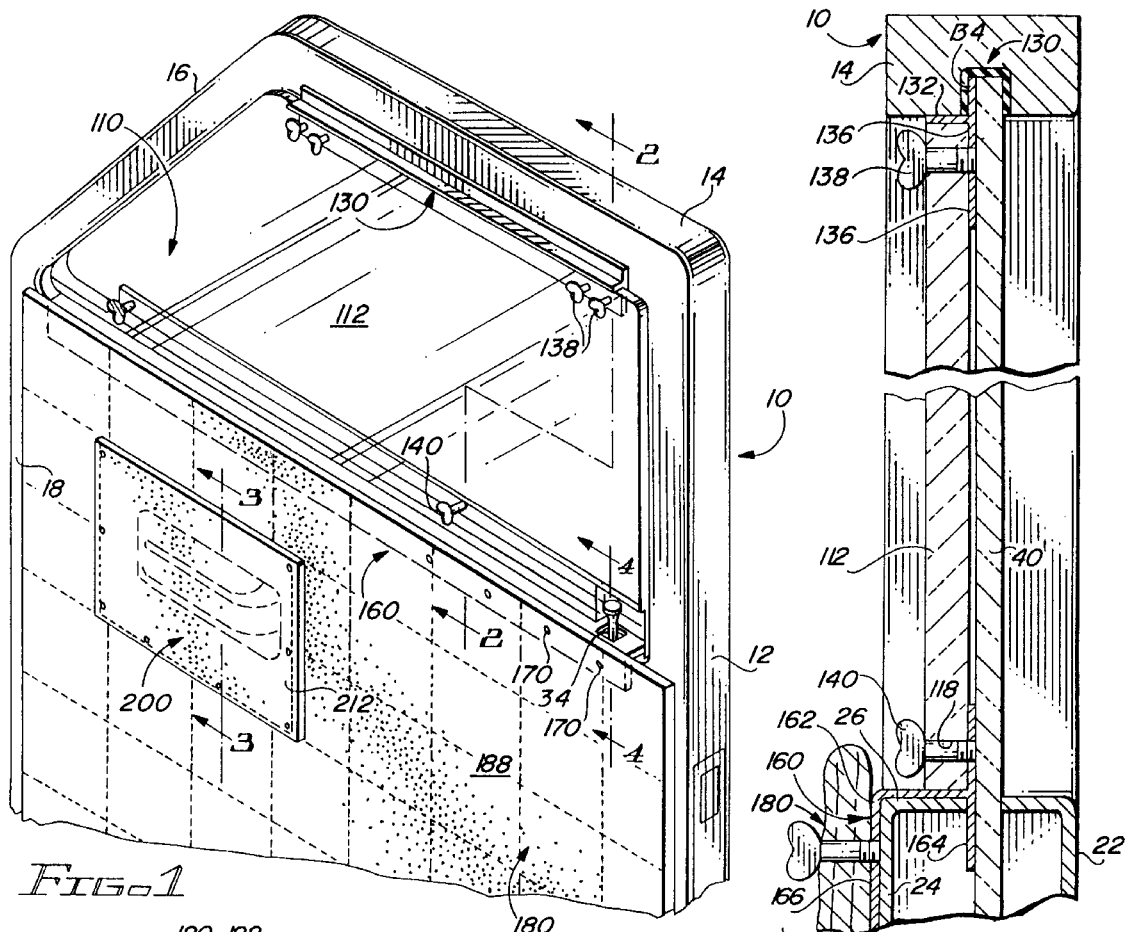

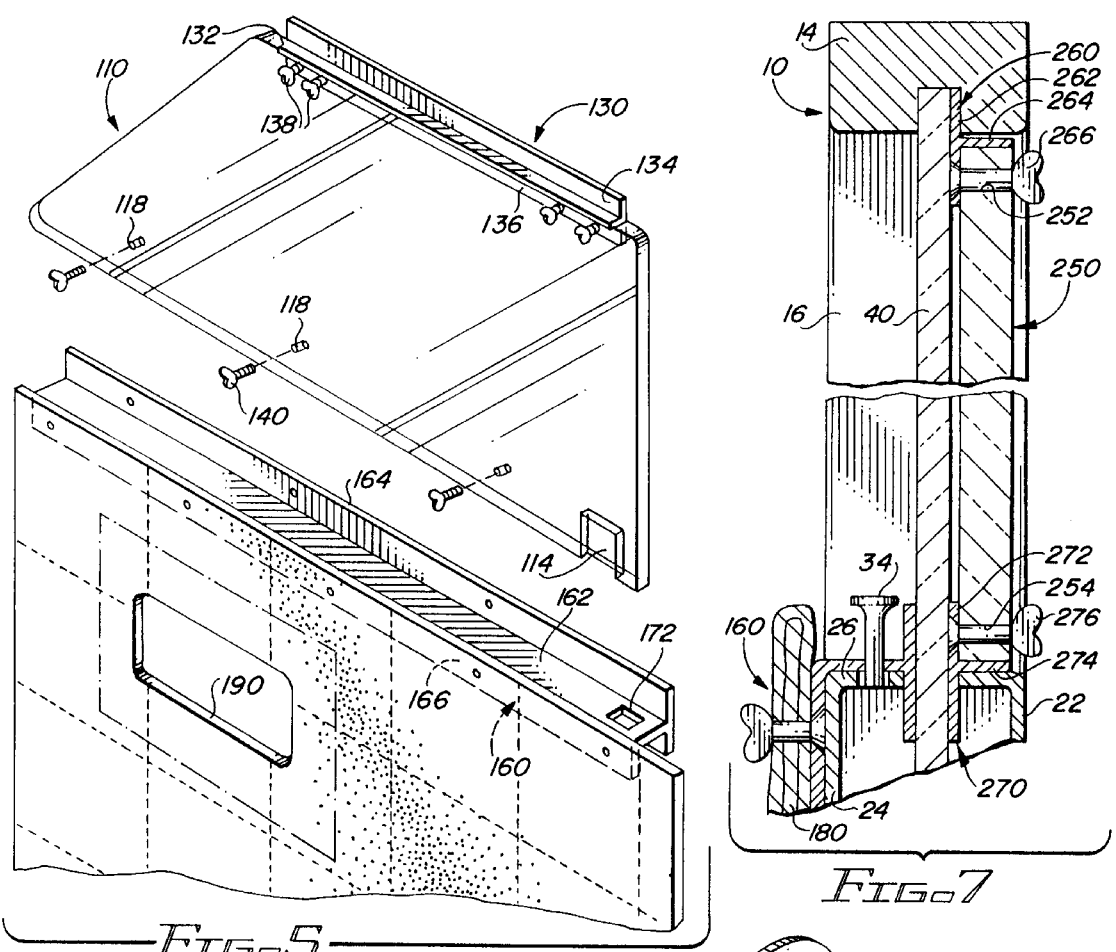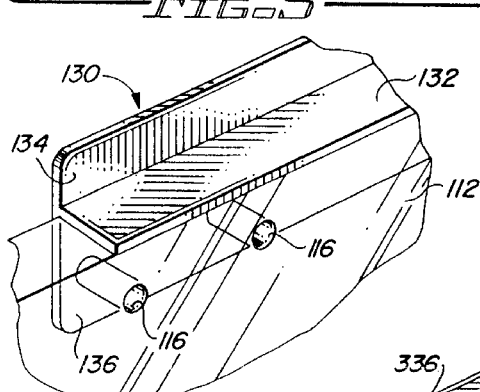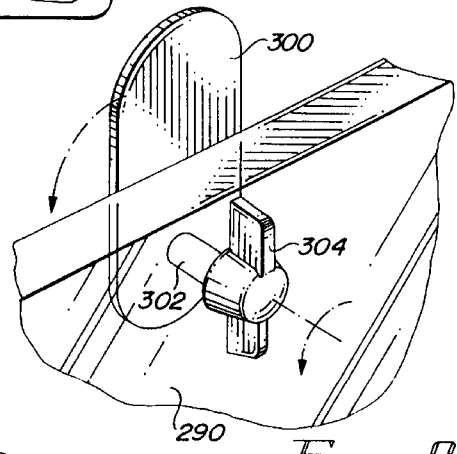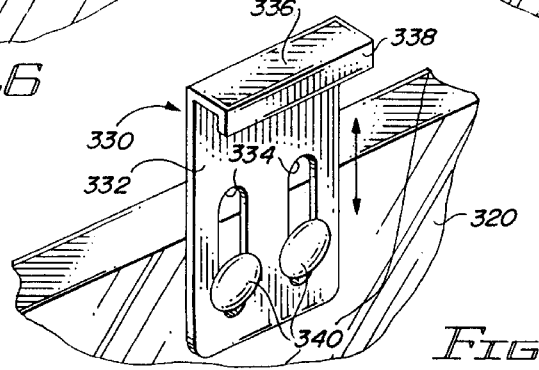

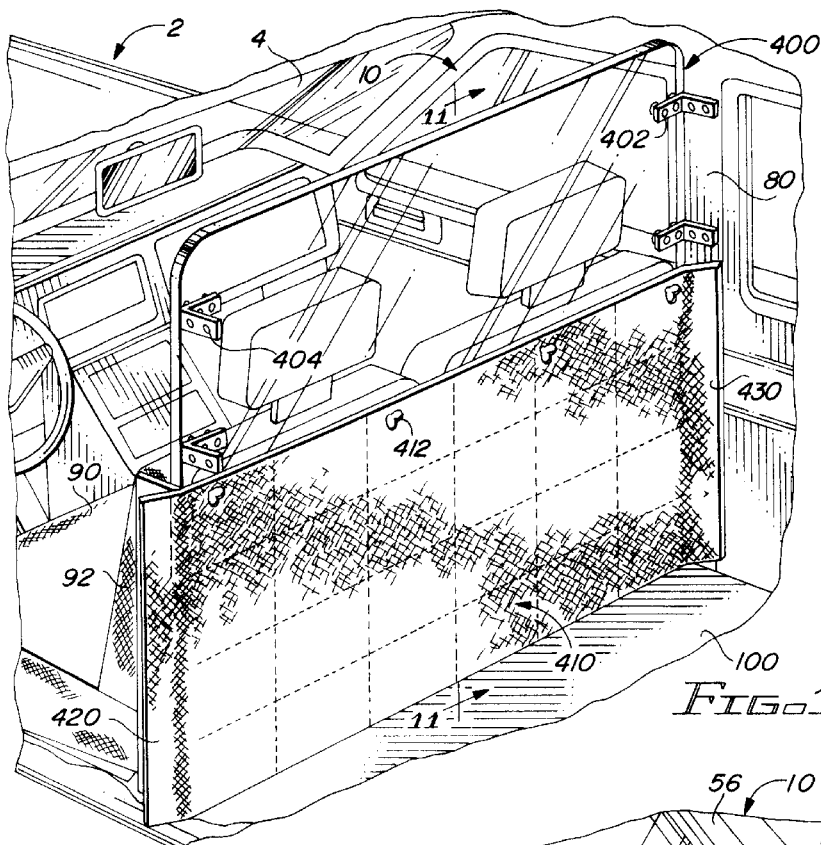
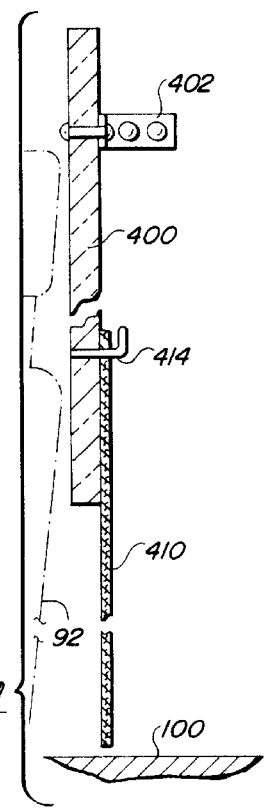
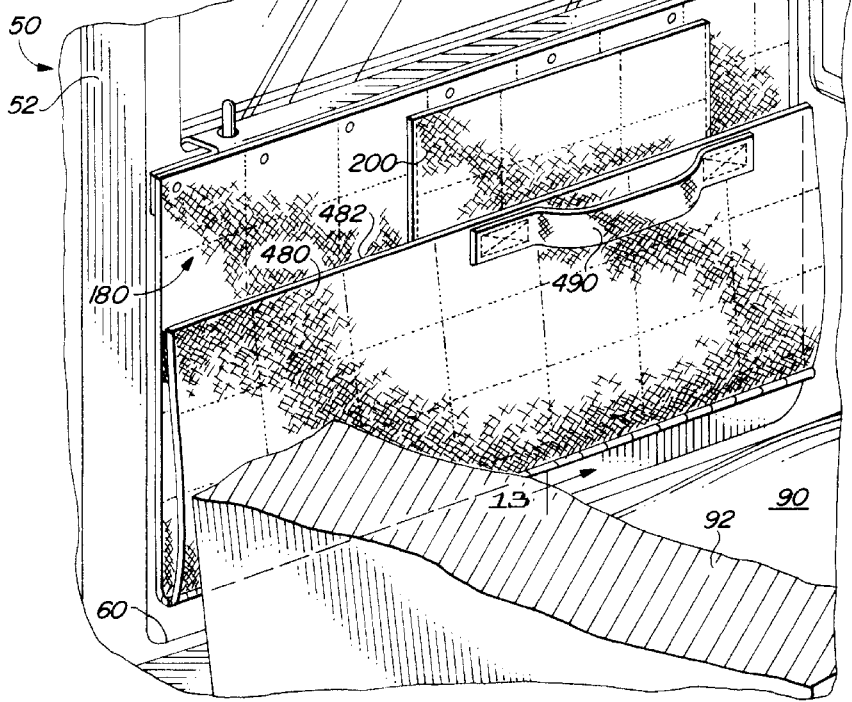
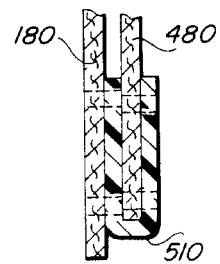
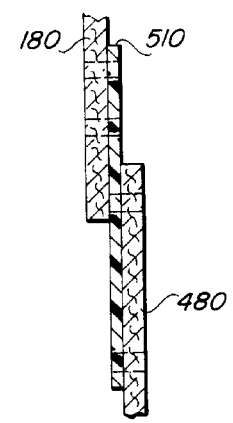
FIG.-10
FIG.-11
FIG.-12
FIG.-14A
FIG.-14B

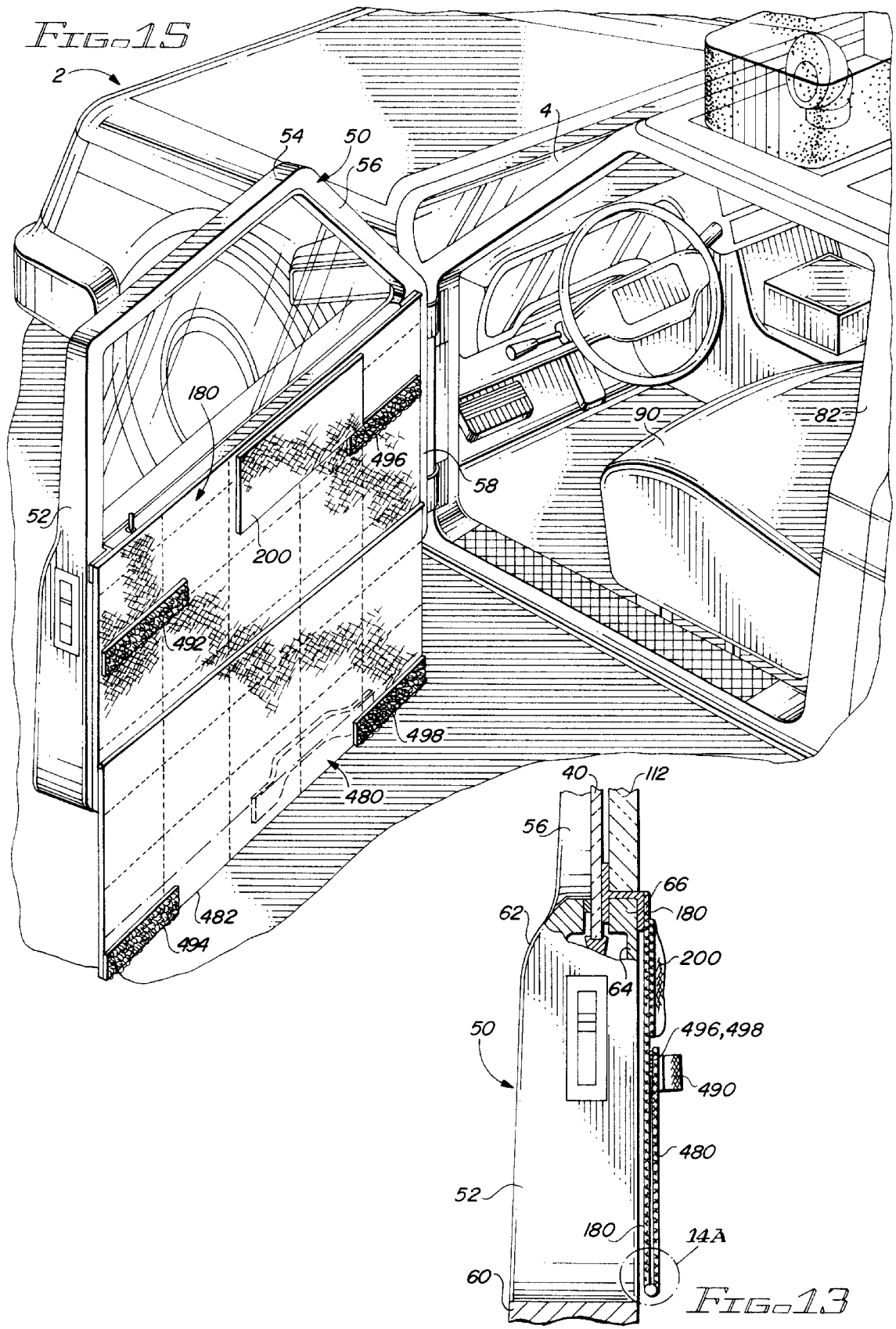

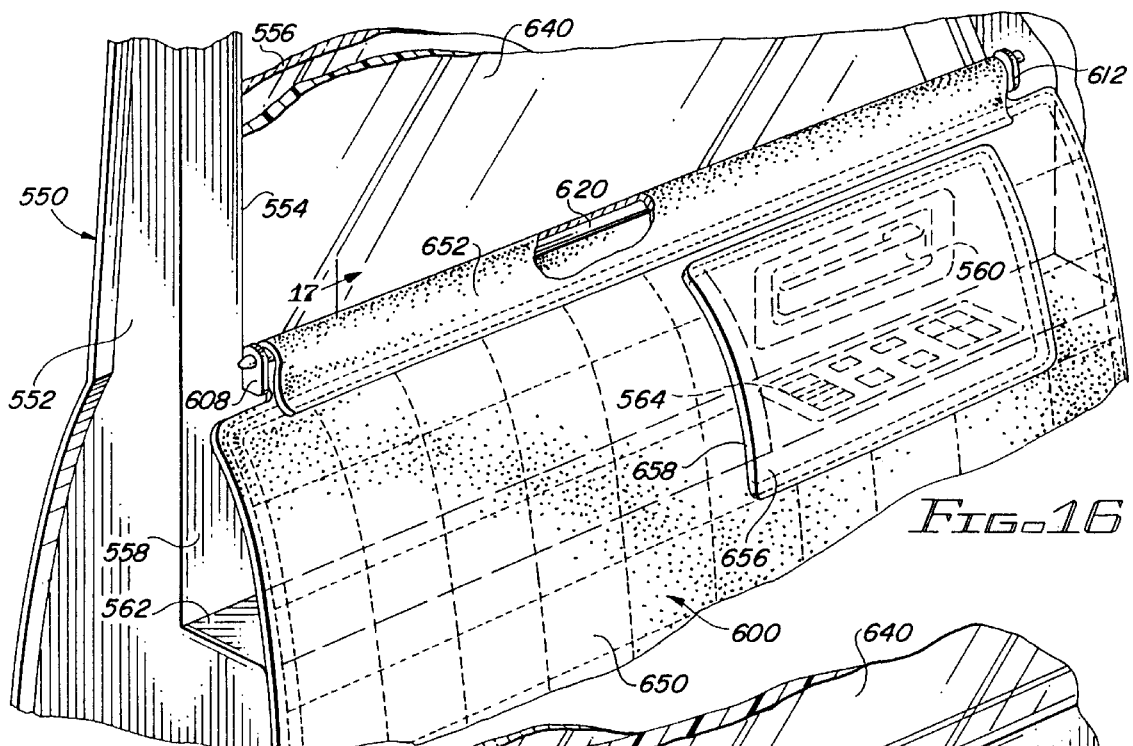
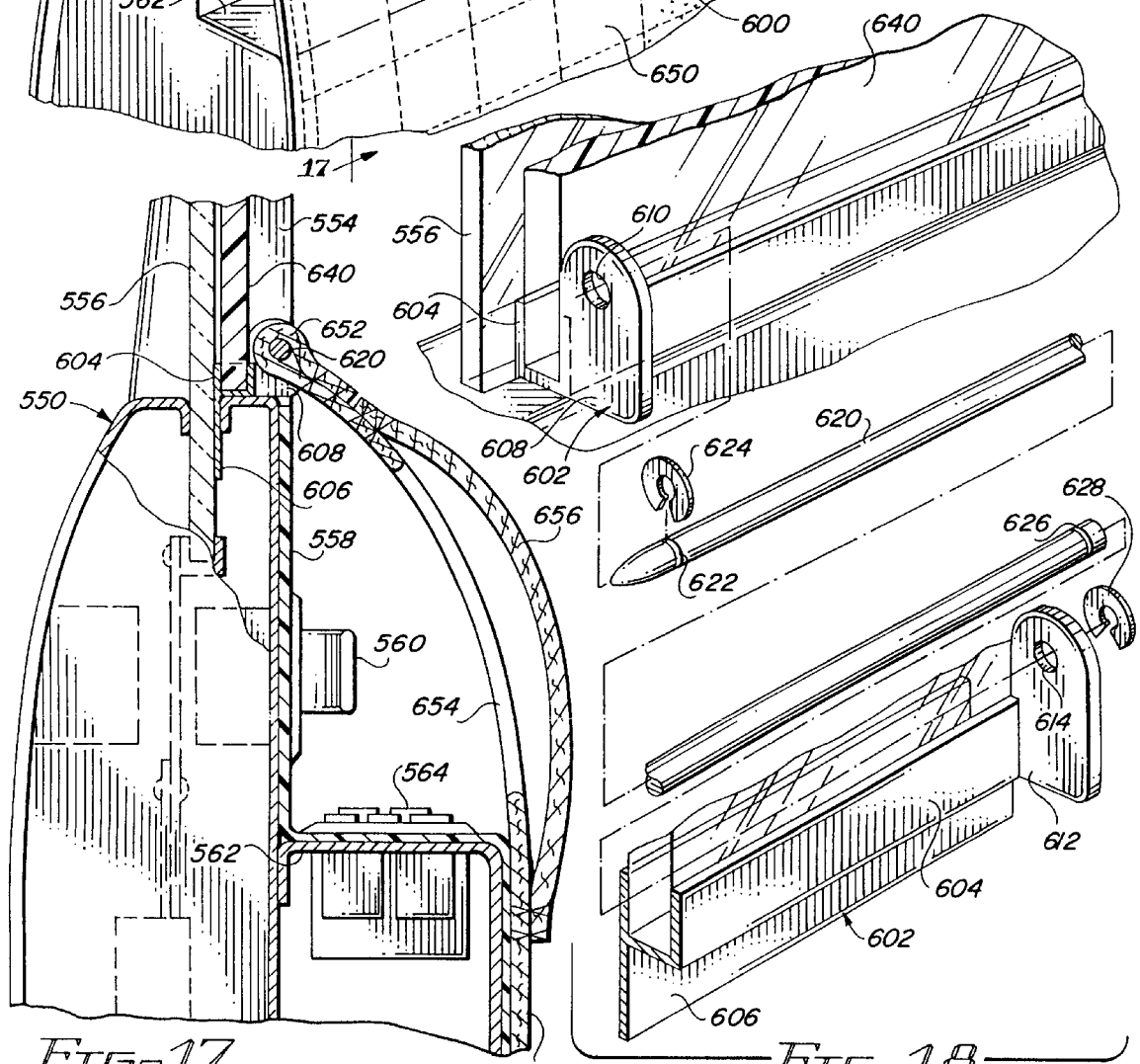

REMOVABLE BULLET RESISTANT APPARATUS FOR VEHICLES

CROSS REFERENCE TO RELATED APPLICATION

This application is a Continuation application of Ser. No. 08/392,056, filed Feb. 22, 1995, now abandoned, which was a Divisional application of Ser. No. 08/316,253, filed Sep. 30, 1994, now U.S. Pat. No. 5,413,026, which was a Divisional application of Ser. No. 08/139,313, filed Oct. 19, 1993, now U.S. Pat. No. 5,370,035, which was a Continuation-In-Part of Ser. No. 07/792,645, filed Nov. 15, 1991, now U.S. Pat. No. 5,271,311.

BACKGROUND OF THE INVENTION

1. Field of the Invention

This invention relates to vehicles and, more particularly, to apparatus for providing bulletproof or bullet resistant protection for occupants of a vehicle and which apparatus is easily installed in a vehicle and is easily removed from the vehicle.

2. Description of the Prior Art

U.S. Pat. No. 1,443,708 (Fenton) discloses a armor system for a vehicle. The armor includes a plurality of holes, with glass elements covering some of the holes. The holes covered by glass elements comprise viewing apertures. Armor plate cover some of the holes from the interior. Some of the interior armor plate may be removed so that firearms may be used from the inside of the vehicle shooting through the holes.

U.S. Pat. No. 1,913,554 (Luker) discloses a bulletproof covering for portions of a vehicle, including the radiator and tire. The bulletproof covering or armor is designed to protect the front end of a vehicle.

U.S. Pat. No. 2,363,573 (Costa) discloses what is referred to as an armor shell for a motor vehicle. Virtually the entire vehicle is covered with an armor shell. There are gun ports in the shell and viewing slits for observing outside the vehicle.

U.S. Pat. No. 3,855,898 (McDonald) discloses sheeting material applied to the interior of a vehicle. The sheeting includes transparent covering for the windows and panels which extend over the doors. The door panels are preformed in a particular configuration and are permanently secured in place. U.S. Pat. No. 4,316,404 (Medlin) discloses a lightweight armored vehicle and a method of making the lightweight armored vehicle. The disclosed method comprises stripping a vehicle interior, and using different types of bullet proof material for the interior of the vehicle and also for the gasoline tank of the vehicle.

U.S. Pat. No. 4,352,316 (Medlin) comprises a continuation-in-part patent of the '404 patent. It accordingly contains virtually the same method and apparatus, but with different materials involved, namely woven polyester glass sheeting.

The patents discussed in the preceding paragraphs all utilize a permanent installation of bullet proof material in a vehicle. Accordingly, substantial changes are made in the vehicles to bulletproof them. The substantial changes include substantial costs involvement, as may be understood and expected. The apparatus of the present invention comprises a relatively inexpensive, yet provides substantial protection from bullets fired from outside the vehicle. The protection is afforded to the driver and other passengers in the vehicle by employing a combination of transparent bulletproof material and flexible ballistic fabric or cloth material, such as made of aramid fibers, typically of the "KEVLAR" type of woven material, or polyethylene fibers, such as "SPECTRA SHIELD" type nonwoven material or "DYNEEMA" material, or other flexible bulletproof material which may be easily installed and easily removed from a vehicle.

SUMMARY OF THE INVENTION

Invention described and claimed herein comprises bulletproof panels of transparent material and flexible, cloth material which may be easily secured to and removed from a vehicle. The transparent material is placed adjacent to the side door windows and may be placed over the back seat in place of, or in addition to, the screens that are typically placed behind the front seat in law enforcement vehicles to separate persons in the back seat from the officers in the front seat of the vehicle. A curtain or panel of flexible, cloth material is placed beneath the transparent material both on the doors beneath the windows and on the panel behind the front seat.

In law enforcement vehicles, the curtain or panel of flexible cloth material on a door may include an extra flap of the flexible cloth material that is pivotally secured to the lower portion of the curtain or panel on the door so the extra flap may be lowered to act as a shield when the door is open. The extra flap may extend from the bottom of the door downwardly to the ground to provide substantially complete protection for an officer disposed behind the door.

Among the objects of the present invention are the following:

To provide new and useful removable bulletproof apparatus for vehicles;

To provide new and useful removable bulletproof apparatus including transparent panels and panels of flexible, fibrous material secured to and extending downwardly from the transparent panels;

To provide new and useful bulletproof apparatus for an vehicle door which includes a door panel of flexible, fibrous cloth disposed against the door and a bottom panel of the flexible, fibrous cloth material pivotally secured to the door panel so that the bottom may be deployed downwardly from the door when the door is opened;

To provide new and useful removable bulletproof apparatus for a vehicle which may be relatively easily secured to and removed from a vehicle;

To provide new and useful bulletproof material for a law enforcement vehicle having a transparent panel disposed behind the front seat and layers of flexible, fibrous material extending downwardly from the transparent panel; and To provide new and useful apparatus for a vehicle which includes a bulletproof transparent panel and a bulletproof flexible panel secured to and extending downwardly from the transparent panel.

BRIEF DESCRIPTION OF THE DRAWING

FIG. 1 is a perspective view of a vehicle door with the apparatus of the present invention secured thereto.

FIG. 2 is a view in partial section taken generally along line 2—2 of FIG. 1.

FIG. 3 is a view in partial section taken generally along line 3—3 of FIG. 1.

FIG. 4 is a view in partial section taken generally along line 4—4 of FIG. 1.

FIG. 5 is an exploded perspective view of the apparatus of FIG. 1.

FIG. 6 is an enlarged perspective view of a portion of the apparatus of the present invention.

FIG. 7 is a view in partial section of an alternate embodiment of the apparatus shown in FIG. 4.

FIG. 8 is an enlarged perspective view of an alternate embodiment of the apparatus of FIG. 7.

FIG. 9 is a perspective view of an alternate embodiment of the apparatus of FIG. 7.

FIG. 10 is a perspective view of a portion of the apparatus of the present invention.

FIG. 11 is a view in partial section taken generally along line 11—11 of FIG. 10.

FIG. 12 is a perspective view of an alternate embodiment of a portion of the apparatus of the present invention.

FIG. 13 is a view in partial section taken generally along line 13—13 of FIG. 12.

FIG. 14A is an enlarged view in partial section taken generally from circle 14A of FIG. 13.

FIG. 14B is a view in partial section sequentially illustrating the operation of the apparatus of FIG. 14A.

FIG. 15 is a view in partial section illustrating a use environment for the apparatus of FIG. 12.

FIG. 16 is a fragmentary perspective view of another alternate embodiment of the present invention.

FIG. 17 is a view in partial section taken generally along line 17—17 of FIG. 16.

FIG. 18 is an exploded perspective view in partial section of a portion of the apparatus of FIGS. 16 and 17.

DESCRIPTION OF THE PREFERRED EMBODIMENT

In FIG. 1, a portion of a door 10, which comprises a right front door, of a vehicle is shown. FIG. 1 comprises a perspective view of a portion of the right front door 10 with apparatus 110 of the present invention secured thereto. The door as illustrated in FIG. 1 includes an end frame member or panel 12, a top frame member or panel 14, a top front sloping frame member or panel 16, and a lower front end frame member or panel 18. Not shown are hinge details, etc., since they are not pertinent to the explanation of the present invention and since they are well known and understood in the art.

Details of a vehicle 2, of which the door 10 is a portion, or to which the door 10 belongs, are illustrated in FIGS. 10, 12, and 15. The vehicle 2 includes windshield 4, shown in FIGS. 10, 12, and 15, and a left front door 50 is shown in FIG. 12 and in FIG. 15.

The left front door 50 includes an end frame member or panel 52, a top frame member or panel 54, a top sloping front frame member or panel 56, a lower generally vertical front frame member or panel 58, and a bottom frame member or portion 60. Additional details of the door 50 are shown in FIG. 13. FIG. 13 comprises an end view of the door 50, showing the end panel 52, the bottom member 60, an outer panel 62, an inner panel 64, and an inner sill 66.

FIG. 11 comprises a perspective view of a portion of the vehicle 2 in which a front seat 90 and a front seat back 92 is shown. FIG. 12 is also a perspective view of a portion of the vehicle 2, showing the left front door 50, with portions of the front seat 90 and the seat back 92 also shown.

FIG. 15 is a perspective view of a portion of the vehicle 2, showing the left front door 50 open. Again, a portion of the front seat 90 is shown, and a left door post 82 is shown. A right door post 80 is shown in FIG. 11.

A structural detail of the vehicle are illustrated and are discussed only in conjunction with the apparatus of the present invention insofar as the structural details of the vehicle directly relate to the apparatus of the present invention. Generally, the discussion will be limited to the apparatus of the present invention, and its various portions or embodiments.

Returning again to FIG. 1, the apparatus 110 of the present invention is shown secured to the right front door 10. The apparatus 110 includes a transparent panel 112 disposed against window glass 40 of the front door 10, and a flexible curtain 180 extending generally over the lower portion of the door below the transparent panel 112. Thus, the apparatus 110 essentially covers the door 10.

FIG. 2 is a view in partial section taken generally through the door 10 and the apparatus 110 generally along line 2—2 of FIG. 1. FIG. 3 is a view in partial section through a portion of the door 10 and through a portion of the curtain 180, taken generally along line 3—3 of FIG. 1. FIG. 4 is a view in partial section through a portion of the door 10 and the apparatus 110 taken generally along line 4—4 of FIG. 1.

FIG. 5 is an exploded perspective view of the apparatus 110, illustrating the transparent panel 112 separated from the curtain 180, and illustrating the fastener elements or brackets used to secure the transparent panel 110 to the window 40 and to secure the transparent panel 110 to the curtain 180, and to secure the curtain 180 to the door 10. For the following discussion, reference will primarily be made to FIGS. 1, 2, 3, 4, and 5.

In addition to the end frame member 12, top frame member 14, top front frame member 16, and lower front end frame member 18, the door 10 also includes an outer panel 22 and an inner panel 24. There is also an inner sill 26, shown in best in FIGS. 2 and 4. It will be noted that the door 10 is simplified for purposes of illustrating the apparatus of the present invention. The door 10 is a typical door of a vehicle, and accordingly the various elements may vary from vehicle model to vehicle model. However, generally, each of the vehicles to which the apparatus 110 will be secured will include a complete door with steel panels and frame members about the window. Obviously, hard top models, or convertible models, will not include the top door frame portions. Embodiments of the present invention for such vehicles will be discussed below.

As best shown in FIG. 3, the door 10 also includes a handle recess 30 and handle elements 32 in the inner panel 24. Again, details of the door handle and related elements are not illustrated. The importance of the handle recess 30 and handle elements 32 are important only in conjunction with a portion of the curtain 180, as will be discussed below.

In FIG. 4, a door lock 34 is illustrated. Once again, the door lock 34 is exemplary only as it pertains to the apparatus of the present invention, namely to the transparent panel 112. The door lock 34 is illustrated as extending vertically upwardly from the inner sill 26 of the door 10.

The transparent panel 112 is configured generally to fit within the window portion of the door frame, and specifically within the door frame below the top panel or frame member 12, between the sloping front frame member or panel 16 and the upper portion of the end frame member or panel 12, and above the sill 26. The transparent panel 112 includes a notch or recess 114 in which is disposed the lock member 34.

The transparent panel 112 may be of any well known construction and made of generally bulletproof materials, such as a polycarbonate material of one or more layers, and which may be sandwiched with other materials, as desired. Such construction is well known and understood in the art. The thickness of the transparent material 112, and its specific structure, depends on the extent of the protection desired relative to the penetration of bullets. Accordingly, for relatively low powered bullets, one thickness may be used, and for stopping higher powered bullets, thicker material will be used. Regardless, such is well known and understood in the art.

The panel 112 is secured to the window 40, or to the window frame, namely the upper portion 14 of the door frame, as discussed above, by an upper window support bracket 130. The bracket 130 includes a horizontal plate 132 and a vertical flange having two portions, a top portion 134 and a bottom or lower portion 136. The horizontal plate 132 divides the vertical flange into the two portions.

The horizontal plate 132 is dimensioned to fit over the top of the panel 112. As best shown in FIG. 4 and 6, the vertical length or height of the flanges 134 and 136 are not equal. The lower vertical flange 136 is considerably longer than the upper vertical flange 134.

The transparent panel 112 is secured to the lower vertical flange 136 by a plurality of screw elements 138. The screw elements 138 include wing elements to facilitate the securing of the fastening elements or screws 138 through the panel 112 to the bracket 130. The panel 112 includes appropriate apertures or holes through which the fastener elements 138 extend. The flange 136 include appropriately tapped holes to receive the fastener elements 138.

Details of the bracket 130 are also shown in FIG. 6, which comprises a perspective view of a portion of the bracket 130 and the panel 112.

A pair of apertures or holes 116 are shown extending through the panel 120. The holes or apertures 110 are aligned with tapped holes in the lower flange 136 and receive the wing screws or fastening elements 138.

The upper flange 134 extends upwardly into the door frame 14, as best shown in FIG. 4. The upper flange 134 provides stability for the upper portion of the panel 112.

There is a curtain hanger bracket 160 disposed on the sill element 26 of the door 10. The curtain hanger bracket 160 includes a generally horizontal plate 162 which is disposed on the inner sill 26, a vertically extending "rear" plate or flange 164, and a vertically downwardly extending "front" plate or flange 166. An opening 172 extends through the horizontal plate 162 to provide access for the door lock 34. This is best shown in FIG. 5.

The upwardly extending flange 164 is disposed against the window, as shown in FIGS. 2 and 4. The bottom portion of the transparent panel 112 is disposed on the horizontal plate 162 and against the upper portion of the "rear" flange 164. The transparent panel 112 includes a plurality of holes 188 that are aligned with tapped holes or apertures in the upper portion of the flange 164. Fasteners 140, which are substantially identical to the fasteners 138, extend through the holes 118 and into the tapped holes or apertures in the flange 164 to secure the lower portion of the panel 112 to the bracket 160.

The lower portion of the flange 164 extends downwardly against the window 40 and below the sill 26 to help anchor or secure the bracket 160 in place on the sill 26.

The curtain 180 comprises a plurality of cloth layers, such as woven fibrous material typically made of aramid fibers, and generally known and sold under the "KEVLAR" trademark or brand name, or layers of fibrous material held together by flexible resins, such as marketed under the "SPECTRA SHIELD" trademark.

The cloth layers are disposed within a covering, of which an inside covering portion 184 and an outside covering portion 186 are illustrated. The cloth layers 182 are disposed between the coverings 184 and 186. Appropriate stitching 188 may be used. The stitching resembles quilted stitching in that the curtain 180 resembles a quilted element with generally square or rectangular stitching extending both vertically and horizontally.

An inherent advantage of the use of flexible fibrous layers is the ability of the flexible material to "give" as it absorbs the shock from a bullet projectile. The "give" in the flexible curtain may be contrasted with a relatively solid material and the inability of the relatively solid material to "give" and thus to depend only on the inherent strength or thickness of the solid material to absorb the energy and shock of a bullet projectile. Moreover, flexible material, and particularly the "SPECTRA SHIELD" type material, is quite effective in providing protection from angled shots.

The curtain 180 is appropriately secured to the outside vertical flange 166 of the bracket 160 by a plurality of fasteners 170. The fasteners or fastening elements preferably include wing handles to facilitate the securing of the panel and curtain to the bracket and the fasteners may be referred to sometimes herein as "wing nuts" or "wing screws."

The upper portion of the curtain 180 extends above the horizontal plate 162 and accordingly overlaps the lower or bottom portion of the transparent panel 112 to provide an extra degree of protection in the area of the bracket 160.

As best shown in FIG. 3, there is a handle cutout 190 in the curtain 180. The handle cutout 190 is covered by a pocket flap 200. The pocket flap 200 is substantially identical in construction to the curtain 180. It includes a plurality of fibrous layers 202 disposed within a cover. The cover includes a inside portion 204, an outside portion 206, a top portion 208 and a bottom portion 210. Appropriate stitching or fastener elements 212 are used to secure the pocket flap 200 to the curtain 180. The fasteners or stitching extends about the pocket flap or opening as appropriate for the construction of the vehicle. The top of the pocket flap 200 may be open to allow access to the door handle mechanism 32, or a side may be open, or whatever is appropriate. In FIG. 3, the top is shown open. Preferably, the flap will be stitched or secured on three sides to the curtain.

It will be noted that the pocket flap 200 is substantially larger than the handle cutout 190. This, of course, is for security reasons, or to insure that there are essentially no practical gaps or openings in the curtain 180 which a bullet or other projectile could come through.

It is noted that the thickness of the pocket flap 200 is substantially the same as that of the curtain 180. Moreover, the pocket flap 200, like the curtain 180, includes a covering for the fabric layers 202.

FIG. 7 is a view in partial section of an alternate embodiment of a portion of the apparatus of FIGS. 1–6, namely the transparent, bulletproof panel 112. In FIG. 7, a bulletproof transparent panel 250 is secured to the outside of the window 40. In FIG. 7, a portion of the door frame, namely the top door frame or panel 14, is shown, along with the outer door panel 22 and the inner door panel 24 beneath the window. The top front portion 16 of the front door is also shown. The window 40 is in its up position, nested within the top frame member 14. The curtain hanger bracket 160 is shown disposed on the sill 26, and extending outwardly therefrom, with the curtain 180 secured to the bracket 160. However, the transparent panel 250 is secured to the outside of the door and to the window 40, rather than on the inside of the door frame and on the outside of the window, as illustrated in FIGS. 1, 2, and 4.

The transparent bulletproof panel 250 is substantially the same configuration and composition as is the panel 112. However, the panel 250 is secured to the window 40 and to the door 10 in a different manner. For the panel 250, there is a top bracket 260 and a bottom bracket 270. The top bracket 260 includes a vertically extending flange 262 and a horizontally extending flange 264. The horizontally extending flange 264 is generally perpendicular to the flange 262 and extends outwardly from about the mid point, vertically speaking, of the flange 262.

The upper portion of the vertical flange 262, above the horizontal flange 264, extends upwardly into the frame 14. The lower portion of the vertical flange 262 below the horizontal flange 264 is disposed between the window 40 and the panel 250. The flange 262 is disposed against the outside of the window 40, with the top of the panel 250 disposed against the bottom of the horizontal flange 264.

The bottom bracket 270 is substantially identical to the bracket 260. The bracket 270 includes the vertical flange 272 and a horizontal flange 274. The vertical flange 272 is disposed against the window 40 and the bottom of the panel 250 is disposed against the upper portion of the flange 272 and against the top portion of the flange 274. The lower portion of the vertical flange 272 extends against the window 40 and beneath the outer door panel 22.

As may be noted, the brackets 260 and 270 are substantially identical not only to each other but also to the bracket 130.

The transparent panel 250 includes a plurality of upper holes or apertures 252 and a plurality of lower apertures or holes 254. The holes 252 and 254 extend through the panel 252 and are aligned with mating tapped apertures or holes in the flanges 262 and 272, respectively. Appropriate fastening elements 266 and 276 extend through the holes or apertures 252 and 254 and into the flanges 262 and 272 respectively, to secure the panel 250 to the brackets 260 and 270 respectively, and thus to secure the panel 250 to the door 10.

An advantage to having the panel 250 disposed on the outside of the window 40 is simply to prevent the window 40 from being shattered in case bullets are fired at the window 40. The bulletproof panel 250 will prevent the shattering of the window 40.

It will be noted that the bracket 160 is still used to secure curtain 180 to the portion of the door 10 below the window 40.

Alternate brackets are shown in FIGS. 8 and 9 for securing the a transparent panel to a vehicle, or to a window or a door frame. In FIG. 8, a transparent panel 290 is shown with a pivoting plate 300 secured thereto. The pivoting plate includes a pin 302 which extends through a hole or aperture in the panel 290. On the "inside" of the window 90, an on the end of the pin 302 remote from the plate 300, there is a lever or handle 304.

The plate 300 is disposed against the "outside" of the panel 290 and pivots in response to rotation of the handle 304. The dash dot arrow in FIG. 8 illustrates the pivoting of the plate 300. When the plate 300 is in its "down" position, or is generally horizontally extending, the panel 290 is put in place against the inside of a window. The handle 304 is then rotated ninety degrees to pivot the plate 300 to the position shown in FIG. 8. In this position, the plate 300 will be disposed within a door frame, and accordingly will secure the upper portion of the panel 290 to the door and against a vehicle window (not shown).

In FIG. 9, a different type of bracket is shown, and the bracket illustrated in FIG. 9 may be used for hardtop vehicles or convertible vehicles in which there is no specific door frame recess in which a top hanger bracket, such as the bracket 130, or a pivoting plate, such as the plate 300, may extend.

In FIG. 9, a transparent panel 320 is shown with a bracket 330 secured thereto. The bracket 330 comprises a generally inverted "L" shaped bracket which includes a vertical flange 332, a top horizontal flange 336, and a short downwardly extending flange 338 remote from the flange 332. The vertical flange 332 includes a pair of generally vertically extending slots 334. A pair of fasteners 340 extend through the slots 334. The fasteners 340 are fixed in place and allow the bracket 330 to move vertically relative to the fasteners 340 and accordingly relative to the transparent panel 330.

In operation, the panel 320 is disposed against a window, with the window rolled down slightly. The horizontally extending flange 336 is placed on the top of the window, and the window is then rolled upwardly. The downwardly extending flange 338 secures the bracket 330 to the window, as a "hook" on the window. In this manner, the upper portion of the panel 320 is secured to a vehicle window and door.

While the bracket 330 may be disposed against the inside of a window, it may preferably be disposed against the outside of a window, with a bracket, such as the bracket 270 of FIG. 7, securing the lower portion of the panel 320 to a door.

In FIG. 10, which is a perspective view of a portion of the vehicle 2, a transparent panel 400 is shown disposed behind the seat back 92. The transparent panel 400 is shown with a pair of brackets 402 securing the panel 400 to the right door post 80 and a pair of brackets 404 which will be used to secure the panel 400 to the left door post 82 (see FIG. 14).

The brackets 402 and 404 are merely generally "L" shaped brackets, or angle brackets, which may be appropriately secured, as by screws, bolts, or the like, to both the transparent, bulletproof panel 400 and the door posts 80 and 82.

Secured to the lower portion of the transparent panel 400, and extending downwardly therefrom, and generally covering the entire seat back 92 and extending below the seat back 92 to generally the floor 100 of the vehicle 2, is a flexible curtain 410. The flexible curtain 410 is substantially identical in construction to the curtain 180, discussed above. That is, the curtain 410 comprises a plurality of layers of flexible fibrous material, such as woven or fabric material or fibrous layers appropriately secured together, with an appropriate covering. The covering is stitched to the flexible material, if appropriate or desired, to give the curtain 410 a quilted configuration and appearance.

In FIG. 11, which is a side view in partial section taken generally along line 11—11 of FIG. 10, the bulletproof, transparent panel 400 is shown with the curtain 410 extending below the panel 400. It will be noted that there is a substantial overlap of the curtain 410 relative to the panel 400. This is, of course, for safety reasons.

Also in FIG. 10, a plurality of wing screw type fasteners 412 is shown securing the curtain 410 and the panel 400 together. The fasteners 412 may extend directly into tapped apertures in the panel 400. The wing screw fasteners 412 allow the curtain 410 to be easily and rapidly installed against and removed from the panel 400. With the wing screws 412 removed, there remains only tapped holes.

In FIG. 11, an alternative to the use of wing screw type fasteners is illustrated. Hooks 414 are shown on which the curtain 410 is hung. The installation and removal of the flexible curtain 410 is simpler and faster using hooks than using screws, etc. Hook and loop type fasteners, such as shown and discussed in conjunction with FIGS. 12, 13, and 15, below, may also be used to secure the curtain 410 to the panel 400. Simplicity and convenience may determine how the flexible curtain 410 is secured to the panel 400.

If desired, the curtain 410 may include wing portions at the sides which may be extended to and disposed against the door posts. A wing portion 420 is shown in FIG. 10 disposed outwardly and forwardly, away from the side of the seat back 92 and towards the door post to cover the space between the seat and the door post. The wing portion 420 may be appropriately secured to door post by well known hook and loop type fasteners. The loop portions will preferably be secured to the door post and the hook portions will preferably be secured to the wing portion 420.

On the opposite side of the flexible curtain 410 there is shown a wing portion 430 extending rearwardly and outwardly to the door post 80.

Again, hook and loop type fasteners may be used to secure the wing 430 to the door post 80.

It will be noted that the wings 420 and 430 may need to be hinged to the main panel. A hinge arrangement such as discussed below in conjunction with the embodiment of FIG. 12, 13, 14A, 14B and 15 may be used, if required.

The wing portions 420 and 430 may be compared to the subcurtain or supplemental curtain discussed below in conjunction with FIGS. 12, 13, 14A, 14B, and 15.

FIGS. 12, 13, 14A, 14B and 15 illustrate an alternate embodiment of the curtain apparatus 180, discussed above in conjunction with the embodiment of the apparatus 110. For general usage by ordinary citizens, the apparatus 110 may be most satisfactory. That is, generally speaking, bulletproof protection is typically needed only while riding in a vehicle to protect the occupants of the vehicle from random shootings, and the like. However, for law enforcement purposes, extra protection for law enforcement officers riding in a vehicle may be advantageous. Accordingly, an extra subcurtain or supplemental curtain may be used. Such and element is illustrated in FIGS. 12, 13, 14A, 14B and 15. For the following discussion, reference will primarily be made to FIGS. 12, 13, 14A, 14B, and 15.

In FIG. 12, a supplemental or subcurtain assembly 480 is shown secured to the bottom of the curtain 180. In FIG. 12, the door 50 is shown in its closed position, with the supplemental curtain 480 appropriately fastened to the upper portion of the panel 180. The curtain 480 includes a handle 490 appropriately sewn or otherwise secured to the curtain 490 adjacent to an "upper" edge 482. The term "upper" edge is a relative term, for the convenience of viewing the curtain 480 as illustrated in FIG. 12. As shown in FIG. 15, which comprises a perspective view of the vehicle 2 with the door 50 open, the "top" edge 482 becomes a bottom edge when the bottom or supplemental curtain 480 is deployed downwardly from the curtain 180.

For securing the curtain 482 to the curtain 180, there are pairs of hook and loop fastener elements. There are two loop strips 492 and 496 secured to the curtain 180, and a matching pair of hook fastener elements 494 and 498 secured to the curtain element 480 adjacent to the edge 482. This is best shown in FIG. 15.

Again, the curtain 480 is substantially identical to the curtains 180 and 410 in fabrication. The curtain 480 comprises a plurality of layers of flexible fibrous material, such as cloth woven of appropriate fiber material, such as aramid fibers, or the like, or layers of fibrous material such as "SPECTRA SHIELD" fibers. A covering is used for the layers of fibrous material to help hold them in place, and the curtain 480 accordingly provides substantially the same bulletproof characteristics and protection as does the curtain 180.

If desired, the curtain 480 may include more layers than does the curtain 180, since the curtain 480, when in its down or deployed position as shown in FIG. 15, does not enjoy the protection of at least one layer of steel from the door 50. The layer of steel of the door 50 provides some protection for the curtain 180. However, the purpose of the curtain 480 is to extend downwardly below the door 50 and to the ground or pavement.

An officer, emerging from the vehicle 2, with the door 50 open, may easily deploy the curtain 480 by pulling on the handle 490. The curtain 480 then falls downwardly and the officer may kneel or crouch behind the door 50 and may be protected from bullets or other projectiles by the transparent panel 112, the door 50 and curtain 180, and the supplemental or lower curtain 480.

While the bulletproof curtains 180, 410, and 480 are referred to as flexible, they are not easily folded, and accordingly there is a hinged arrangement between the lower portion of the curtain 180 and the curtain 480. The hinged arrangement is shown in detail in FIGS. 14A and 14B. A similar hinged arrangement may be used for the wings 420 and 430 of the curtain 410, as previously mentioned.

FIGS. 14A and 14B are side views in partial section illustrating the operation of a hinge 510 which connects the curtain 480 to the curtain 180. FIG. 14A is taken generally from circle 14A of FIG. 13. In FIG. 14A, the curtain 480 is disposed along side of the curtain 180, or in its "up" position, as shown in FIG. 12. FIG. 14B is also a side view in partial section showing the curtain 180 and the curtain 480, but with the curtain 480 in its down or deployed position.

The hinge 510 may be an appropriate strap material, or the like, which is appropriately stitched to both the curtain 180 and the curtain 480. The hinge 510 is appropriately secured to the "outside" of the curtain 180, or the side of the curtain 180 facing inwardly toward the inside of the vehicle. The hinge 510 is secured to the opposite side of the curtain 480 so that there is an overlap between the bottom of the curtain 180 and the adjacent portion of the curtain 480 when the curtain 480 is in its down or deployed position.

The hinge 510 preferably extends the full length (or width) of both the curtains 180 and 480. The overlap area of the two curtains, as shown in both FIGS. 14B and 15, provides additional safety for an officer when the curtain 480 is in its down position and the door 50 is open.

The hinge 510 allows the supplemental or lower curtain 480 to be easily pivoted downwardly to its use position as shown in FIG. 15, and then pivoted upwardly to allow the door 50 to be closed. This is shown in FIG. 12 and FIG. 13.

The same type of hinge arrangement may also be employed for the wing portions, such as the wing portion 420, of the apparatus 410, as discussed above in conjunction with FIGS. 10 and 11.

Obviously, the length of the hook and loop fastener elements 492, 494, and 496, 498 will be only as much as is required to conveniently hold the curtain 480 in its up or stowed position. This will of course, minimize the effort required to deploy or lower the curtain 480, as required.

It will be further noted that the handle 490 is conveniently located to be readily accessible to a driver, or specifically to the left hand of the driver, for quick deployment as the door is opened.

The transparent panels 112, 250, 290, 320, and 400 allow a vehicle occupant to see or view through them, but they will stop a bullet or keep a bullet from penetrating, as discussed above. As also discussed, the panels may vary in thickness or in specific configuration, depending on the desired degree of bullet penetration protection.

For the flexible curtain apparatus, two basic types of cloth material have been mentioned, fibrous woven material, such as aramid "KEVLAR" material and fibrous nonwoven "SPECTRA SHIELD" material. While each kind may have advantages in certain implementations, a combination of both types may also be advantageous in certain circumstances.

In FIGS. 16, 17, and 18, a different type of fastener system is shown for securing a flexible curtain to a transparent panel. A simple rod and sleeve system is used, with a clip on each end of the rod.

A major advantage of the system is the speed and ease of installation and removal of the curtain. Another advantage is a greater extent of overlap in the area of the bottom of the panel and the top of the curtain.

FIG. 16 is a perspective view of an alternate embodiment of the apparatus of the present invention. FIG. 17 is a view in partial section of the apparatus of FIG. 16 taken generally along line 17—17 of FIG. 16. FIG. 18 is an exploded perspective view of a portion of the elements shown in FIGS. 16 and 17. For the following discussion, reference will primarily be made to FIGS. 16, 17, and 18.

A door 550, which comprises a left front door, is shown in both FIGS. 16 and 17. the door 550 includes a door end plate 552, a window frame 554, and a window 556 is disposed in the frame 554. The door 550 also includes an inside panel 558 which is disposed below the window 556.

A door handle 560 is shown on the inside panel 558. Below the door handle 560, and spaced downwardly from the window 556, is a ledge 562. A plurality of controls 564, including controls for vehicle windows and locks, is disposed on the ledge 562. Beneath the ledge 562 the panel 558 continues downwardly, as is well known and understood.

In FIG. 17, a number of elements associated with the window 566 are shown in phantom, along with various elements associated with the door handle 560, etc. All such elements are well known and understood in the art.

Shield apparatus 600 is shown secured to the door 550. The shield apparatus 600 includes window frame 602 which is disposed on the bottom of the door frame 564 and adjacent to the window 556. The window frame 602 includes a channel portion 604 in which is disposed a transparent panel 640. The transparent panel 640 is, of course, generally bullet proof, such as discussed above in substantial detail.

Extending downwardly from the channel 604 is a vertical bottom plate 606. The bottom plate 606 provides stability for the frame 602, and is substantially the same as corresponding elements discussed above in conjunction with the other embodiments.

Extending outwardly from the channel portion 604 are two brackets, an end bracket 608 and an end bracket 612. The end bracket 608 includes an aperture 610 extending through the upper portion of the bracket, and the end bracket 612 includes an aperture 614 extending through the bracket at the upper portion thereof. The brackets 608, and 612 extend outwardly substantially perpendicularly to the bulletproof transparent panel 640.

A curtain support rod 604 extends through the apertures 610 and 614. The rod 620 includes circumferentially extending grooves 622 and 626 adjacent to the opposite ends of the rod. A pair of clips 624 and 628 extend into the grooves 622 and 626, respectively, to secure the rod 620 to the bracket 608 and 612. The overall length of the rod 620 is slightly greater than the distance between the bracket 608 and 612, and the grooves 622 and 626 are outwardly from, but adjacent to, the brackets 608 and 612, respectively. Accordingly, when the clips 624 and 628 are in place, the rod 620 is essentially separated by and secured to the brackets 608 and 610, and accordingly to the window frame 602.

A flexible curtain 650 is appropriately secured to the rod 620 and extends downwardly therefrom. As shown in FIGS. 16 and 17, the flexible curtain 650, which is, of course, generally bulletproof, includes an upper loop portion 652 through which the rod 620 extends. Accordingly the flexible curtain 650 is appropriately secured to the frame 602 and extends downwardly therefrom over the inside door panel 558, including the ledge 562, below the window 556.

As best shown in FIG. 17, there is an overlap between the bottom portion of the transparent panel 640 and the upper portion of the flexible curtain 650 for double protection from a bullet impacting adjacent to the bottom of the panel 640 in the upper portion of the curtain 650.

There is a door control opening 654 extending through the curtain 650. The opening 654 is covered by a pocket cover 656 which is appropriately secured to the panel 650. The cover 656 is secured to the curtain 650 on three sides, namely the top side, the bottom side, and the far end (right) side. There is an open end 658 for the cover 656 through which a user's hand extends to provide access to the handle 560 and the controls 564.

As best shown in FIG. 17, there is adequate space through which a user's hand and arm may extend for access to the handle 560 and the control 564. There is also substantial overlap between the cover 656 and the panel 650 about the opening 654 so as to prevent a bullet from penetrating through the opening 654 and into the interior of the vehicle to which the door 550 is secured.

As discussed above, the flexible curtain 650 may be made of appropriate cloth material, such as the woven fibrous material or the nonwoven fibrous material, or a combination of both types of material. The flexible fibrous material is, of course, bulletproof, and includes as many layers as deemed necessary under the circumstances. There is preferably an outer cover for the bulletproof cloth layers, as also discussed in detail above.

Using the rod 620, it is apparent that the flexible curtain 650 may be easily secured in place, as shown in FIGS. 16 and 17, and may be easily removed therefrom if or when desired.

For assembling the curtain 650 to the brackets 608 and 612, the curtain 650 is placed on the rod 620. The rod 620 is then inserted through the brackets 608 and 612, and the clips are inserted into their respective grooves to hold the rod 620 in place. The curtain 650 is then in place beneath the transparent panel 640.

The removal of the clips 624 and 628 allows the rod 620 to be removed from the brackets 608 and 612. With the rod 620 removed from the brackets, the curtain 650 is then easily removed for maintenance or replacement purposes.

While clips 624 and 628 are shown in the drawing, it will be obvious that a pin elements, or other appropriate elements may be used to secure the rod 620 in place in the brackets 608 and 612.

The transparent panel 640 is easily inserted into the window frame 554, as discussed above in conjunction with the other embodiments. With the curtain 650 secured to the bottom of the panel 640 through the frame 602, the entire apparatus 600 is easily installed in a vehicle to provide the desired protection from bullets fired at the vehicle through the door 550, either through the window 556 or through the door 550 beneath the window 556.

It will be noted that a major advantage of the apparatus of the present invention is that the apparatus, both the transparent panels and the flexible curtains, are preferably pre-assembled. Installation on a vehicle is accordingly easily and speedily accomplished.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. In a vehicle having a door movable between a closed position and an open position and having a window in the door, bulletproof apparatus comprising in combination:

a frame removably secured to the door; and flexible curtain means secured to the frame and extending downwardly below the window, including a first portion and a second portion pivotally secured to the first portion and movable between an up and down position.

2. The apparatus of claim 1 in which the flexible curtain means includes a plurality of layers of cloth.

3. The apparatus of claim 1 in which the second portion of the flexible curtain means is fastened to the first portion in its up position when the door is closed.

4. The apparatus of claim 3 in which the second portion is movable to a down position when the door is opened.

5. Bullet resistant flap apparatus for a vehicle door having an open position and a closed position:

a bullet resistant flap secured to the door; and means for pivoting the flap relative to the door between an up position against the door when the door is closed and a down position below the door when the door is open.

6. The apparatus of claim 5 in which the bullet resistant flap comprises a plurality of layers of cloth material.

7. The apparatus of claim 6 which further includes a bullet resistant flexible curtain secured to the door, and the flap is pivotally secured to the curtain.

* * * * *